United States Patent
Fritz et al.

(10) Patent No.: US 11,071,987 B2
(45) Date of Patent: Jul. 27, 2021

(54) SYSTEM AND METHOD FOR RECOVERY OF VALUABLE CONSTITUENTS FROM STEEL-MAKING SLAG FINES

(71) Applicant: Fritz Enterprises, Inc., Trenton, MI (US)

(72) Inventors: Raymond C. Fritz, Monroe, MI (US); Raymond J. Fritz, Monroe, MI (US)

(73) Assignee: Fritz Enterprises, Inc., Trenton, MI (US)

( * ) Notice: Subject to any disclaimer, the term of this patent is extended or adjusted under 35 U.S.C. 154(b) by 0 days.

(21) Appl. No.: 16/601,722

(22) Filed: Oct. 15, 2019

(65) Prior Publication Data

US 2020/0038876 A1 Feb. 6, 2020

Related U.S. Application Data

(63) Continuation of application No. 14/997,769, filed on Jan. 18, 2016, now Pat. No. 10,478,826, which is a continuation of application No. 14/211,953, filed on Mar. 14, 2014, now abandoned.

(60) Provisional application No. 61/791,231, filed on Mar. 15, 2013.

(51) Int. Cl.
| | |
|---|---|
| *B03B 9/04* | (2006.01) |
| *C22B 7/04* | (2006.01) |
| *C22B 1/00* | (2006.01) |
| *B03C 1/30* | (2006.01) |
| *B03C 1/20* | (2006.01) |
| *B02C 23/14* | (2006.01) |
| *B03B 7/00* | (2006.01) |

(52) U.S. Cl.
CPC .............. *B03B 9/04* (2013.01); *B02C 23/14* (2013.01); *B03B 7/00* (2013.01); *B03C 1/20* (2013.01); *B03C 1/30* (2013.01); *C22B 1/00* (2013.01); *C22B 7/04* (2013.01); *Y02P 10/20* (2015.11)

(58) Field of Classification Search
CPC .. B03B 5/28; B03B 9/04; B07B 13/04; B03C 1/00; B02C 23/14; C22B 1/00; C22B 7/04
See application file for complete search history.

(56) References Cited

U.S. PATENT DOCUMENTS

| | | |
|---|---|---|
| 3,049,305 A | 8/1962 | Rath |
| 3,330,644 A | 7/1967 | Haussig |
| 3,905,556 A | 9/1975 | Drage |
| 4,666,591 A | 5/1987 | Imai et al. |
| 5,507,393 A | 4/1996 | Yang |
| 5,609,256 A | 3/1997 | Mankosa |
| 6,142,311 A | 11/2000 | Körber |
| 6,258,150 B1 | 7/2001 | MacKellar |
| 7,810,746 B2 | 10/2010 | Gillis et al. |
| 2013/0240415 A1 | 9/2013 | Keaton et al. |
| 2015/0258552 A1 | 9/2015 | Warkentin et al. |

*Primary Examiner* — Charles A Fox
*Assistant Examiner* — Kalyanavenkateshware Kumar
(74) *Attorney, Agent, or Firm* — Brooks Kushman P.C.

(57) ABSTRACT

A system and method directed to the economical recovery of valuable iron constituents from iron blast furnace and steel-making slag fines wherein the slag is obtained and subjected to a series of classification steps which progressively sort the slag fines by various physical characteristics, including magnetism, size, and density, into relatively iron-rich and relatively iron-poor classifications, resulting in the isolation of iron-rich commercial byproduct at one or more of the classification steps.

20 Claims, 3 Drawing Sheets

SYSTEM AND METHOD FOR RECOVERY OF VALUABLE CONSTITUENTS FROM STEEL-MAKING SLAG FINES

CROSS-REFERENCE TO RELATED APPLICATIONS

This application is a continuation of U.S. application Ser. No. 14/997,769 filed Jan. 18, 2016, now U.S. Pat. No. 10,478,826, which is a continuation of U.S. application Ser. No. 14/211,953 filed Mar. 14, 2014 (now abandoned), which claims the benefit of U.S. provisional application Ser. No. 61/791,231 filed Mar. 15, 2013, the disclosures of which are hereby incorporated in their entirety by reference herein.

TECHNICAL HELD

The present invention relates to recovering valuable constituents from the by-products of the iron and steel-making processes, and more particularly to recovering commercial quality iron product from iron-bearing slag fines.

BACKGROUND

Slag, in various forms and constituent compositions, is a voluminous by-product of the iron and steel making process. In particular, kish slag or de-self slag is a by-product of iron making which includes a relatively low content of iron along with a relatively high content of non-ferrous materials, including sulfur and silicates. Though current attempts to reclaim iron-rich constituents from slag, including grinding, screening and magnetic sortation, have been employed to isolate and recover some of the iron-rich content, steel mills are left with constantly growing stockpiles of the remaining fine particle iron and steel slag. These ever-growing piles of "fines" must be disposed of economically and in an environmentally safe manner.

Iron-bearing fines from various other similar manufacturing and reclamation sources, including iron blast furnace fines and steel fines, also include potentially valuable constituents for which to date an economical method of separating the valuable constituents from the aggregate has remained elusive.

It is thus desirable to develop further processing methods and systems to re-claim as much of the valuable content of these slag fines for productive use, as well as reduce the disposal costs for the remaining material.

SUMMARY

The disclosed system and method is directed to the cost-efficient recovery of valuable iron constituents from iron blast furnace and steel-making slag fines. The slag is obtained and subjected to a series of classification steps which progressively sort the slag fines by magnetic properties, size, and density into relatively iron-rich and relatively iron-poor classifications, resulting in the isolation of iron-rich commercial byproduct at the completion of one or more of the classification steps. The remaining, relatively iron-poor but sulfur and silicate rich residue may be used for other industrial purposes unrelated to steel or iron production, such as additives for cement aggregate or agricultural soil enhancement.

In the disclosed method, the slag fines are sorted magnetically to isolate the relatively larger iron-bearing constituents from the non-magnetic materials. The resulting iron-bearing product is typically then sorted by size or by density in a series of separate classifying steps to progressively separate and isolate relatively iron-rich product from relatively iron-poor remainder. At the conclusion of each step, the relatively iron-rich sort resulting from that step may be isolated for sale or subjected to further processing to further classify the processed material by size or by density.

An additional step of reducing the size of a batch of slag fines, such as by crushing or grinding the material, may be employed as desired to prepare the batch for any of the disclosed classifying steps. Various grinding mills or crushers may be employed for this purpose.

The magnetic classification step(s) may include introduction of a batch of the slag fines to one of a variety of magnetic separators.

The size classification step(s) may include the introduction of a batch of the slag fines onto a variety of dry-screen or wet-screen devices available for this purpose.

The density classification step(s) may include introduction of a batch of the slag fines in slurry form into a hydraulic (or other non-compressible fluid) fluidized bed separator.

This progressive method of magnetic, size, and density classification results in the separation and isolation of one or more separate commercial-quality iron-rich products from the progressively iron-poorer byproduct which then may be re-sold depending upon the nature of its non-ferrous constituencies.

The disclosed system employs the above-described method in a fines processing plant which includes one or more magnetic sorting stations, one or more screening (i.e., size sorting) stations, and at least one fluidized bed for separation and classification of the fines by density/specific gravity into relatively heavier (i.e., metal-rich) and lighter (i.e., silicate-rich) constituencies.

The frequency and order of the above classification steps, as well as the architecture of the system employed to implement this disclosed method, may be varied depending upon the characteristics of the particular slag fines being processed, as well as the targeted minimum iron contents) for the recovered iron-rich product(s). Similarly, further processing and/or classification steps may be employed in addition to the disclosed steps to isolate and recover reusable product(s) from the remaining, relatively iron-poor fines.

BRIEF DESCRIPTION OF THE DRAWN

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
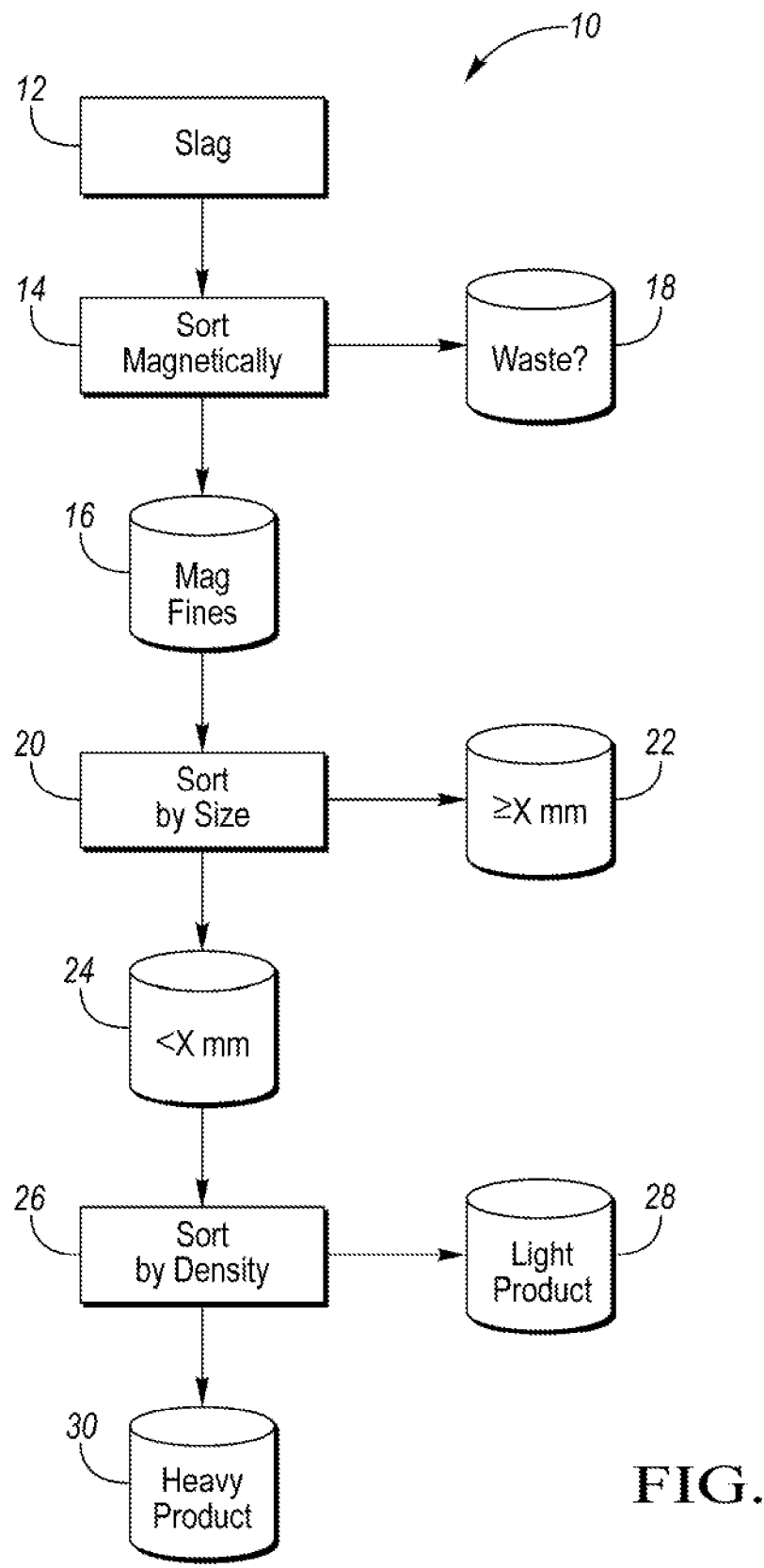
FIG. 1 is a block diagram of the basic steps of one embodiment of the disclosed recovery method.

Referring now to FIG. 1, in one embodiment, the disclosed recovery method 10 employs a series of processing and classifying steps which are progressively and, as required, iteratively employed to isolate relatively iron-rich products from slag fines. Iron and steel-making, slag fines 12, such as kish or de-sulf fines, are supplied as input in the process. In this disclosed embodiment, the slag fines are first input to a magnetic sorter 14 to separate the magnetic (i.e., iron-bearing) fines 16 from the non-magnetic fines 18.

Based upon various characteristics of the batch, including the iron content, particle size, and potentially the non-iron constituents, the material 16 resulting from the magnetic separation is then subjected to one or more additional classifying steps. In this disclosed embodiment the material 16 is then screened, at 20, to separate the particles in the batch by size. It may be desirable, for example, and it is often the case, that the relatively larger-sized particle material 22 isolated as a result of this size classification may be sufficiently iron-rich (e.g., about 40-70% iron by weight) to be collected and sold without further processing. The relatively smaller-sized particle material 24 may then be provided as input to another processing or classifying step in order to further isolate and separate the relatively iron-rich and iron-poor constituents of the material.

In this disclosed embodiment, material 24 may then be provided, at 26, as an input batch to a fluidized bed separator where the material 24 particles are isolated and may be separated by density. The relatively light constituents of the input batch 24 (which typically include slag and other non-metallic particles) 28 are isolated and separated from the relatively heavy constituents 30 (typically including iron and other heavy metals). The heavy product 30 may, at this point, be sufficiently iron-rich (e.g., about 40-80% iron by weight) to be collected and sold without further processing. Alternatively, the heavy product 30 isolated from this density classification 26 may be supplied as an input batch for further processing, where it may be subjected to size or magnetic, or other separation processing to further isolate the relatively iron-rich constituents from the remaining material. The light product 28 may be disposed of, or may be reused as, for example an agricultural or cement product additive, depending upon the content of silicate, sulfur and other non-iron constituents of the product 28.

It will be appreciated that the particle size and constituents of the slag fines collected and used as input to the disclosed recovery system will vary from batch to batch. Similarly, the initial iron content (generally, by way of example, less than about 25% for steel slag and less than about 40% for kish slag), as well as the iron content of the relatively iron-rich batches developed at each station in the disclosed process, may vary. Thus the scope, order, type and number of classification operations may vary in order to obtain optimal iron-rich end products. In the disclosed system the typical raw material, kish fines, include iron content ranging from about 25-40% by weight, sulfur content ranging from about 0.9-3% by weight, and slag content ranging from about 60-30% by weight, as well as lesser amounts of metal (e.g. manganese, molybdenum) alloys. The characteristics of the resultant batches disclosed in the following description, also variable from batch to batch, reflect typical results using the aforementioned described raw material input.

Figure 2:
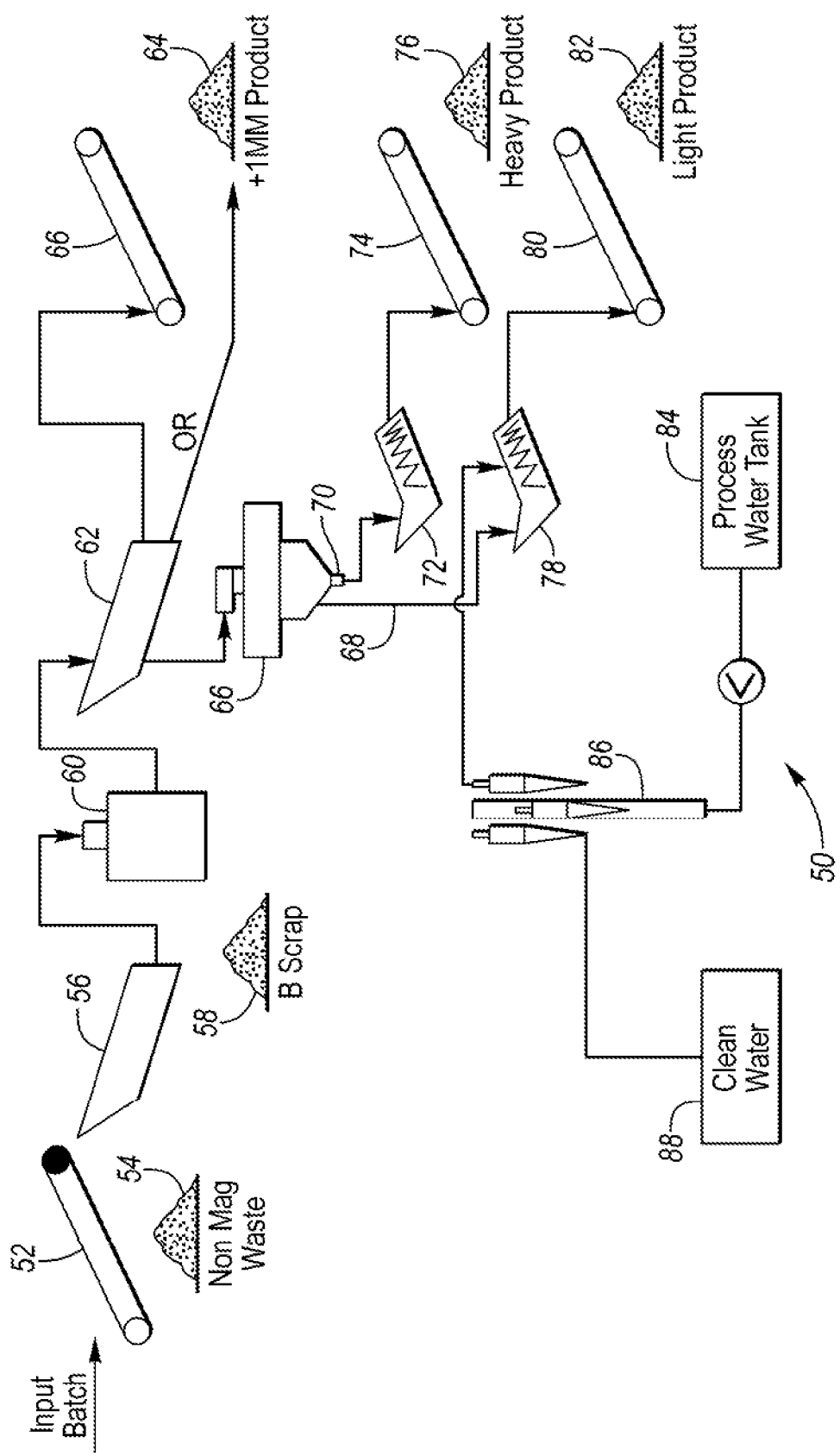
FIG. 2 is a schematic of one embodiment of the disclosed recovery system.

FIG. 2 illustrates one embodiment of the system which may be employed to implement the disclosed recovery methods. The system 50 may include a magnetic separator/conveyor 52 upon which an input batch of the raw material (e.g., kish slag fines) is placed. In this disclosed embodiment, a permanent head pulley is utilized for this purpose. However, other magnetic separators, including, for example, top pluck or cross belt magnetic separators, may be used as appropriate.

As the input batch is conveyed, the magnetic portion of the batch remains on the conveyor, while the non-magnetic portion 54 of the batch is stockpiled for recovery as a potential non-ferrous by-product, or discarded. The magnetic portion of the batch is conveyed to a dry-screen station 56 where it is classified by size. The illustrated system employs a screen 56 suitable for separating batch particles of about 10 mm or greater in size from particles of less than about 10 mm. The relatively larger sized portion 58 is stockpiled. It has been found that this 10+ millimeter magnetic material has a high enough iron content (typically about 50-70%) to be sold as a product (known as "B Scrap"), typically to steel mills. Various commercially available dry screens may be employed for the size classification station 56, depending upon the particular nature of the input batch and the desired size classification objectives.

It should be appreciated that, while the system 50 is depicted as a continuous, in-line process, various portions of the illustrated processing stations may be installed and operated at separate geographic locations. For example, in one embodiment the magnetic separating station 52 and the size screening station 56 are physically located at the site of the slag since, in this embodiment the source of the slag, a steel mill, retains the recovered B Scrap 58 at the site. Thus, for this embodiment, shipping costs (round-trip to the site of the remaining system stations) are avoided for the B Scrap portion of the process material.

In this disclosed embodiment of the system 50, the relatively smaller sized portion separated at screening station 56 is next conveyed as an input batch to a vertical shaft mill 60, where the material is crushed, thereby breaking much of the slag away from the iron-bearing portion of the batch, as well as reducing the size of the batch particles. It will be appreciated that other commercially available mills, grinders, and/or crushers may be employed as an alternative to vertical shaft milling station 60.

The material output from the milling station 60 may next be provided as an input batch to a screening station 62 where the input batch particles are again classified by size. In the illustrated embodiment the screening station 62 employs a wet screening process suitable for separating batch particles of about 1 mm or greater in size from particles of less than about 1 mm. It has been found that the relatively larger sized portion 64 is stockpiled. It has been found that this 1+ mm material often has a high enough iron content (typically about 60-80%) to be sold as a product. Again, as with the dry screen utilized in station 56, various commercially available wet screens may be employed for size classification station 62, depending upon the particular nature of the input batch and the desired size classification objectives.

In the disclosed system 50, the 1+ mm material separated at screening station 62 may optionally be provided as input to a magnetic separator/conveyor 67 where the non-magnetic content of this batch is separated, thereby further raising the iron content of the 1+ mm material 64.

The relatively smaller sized portion of the batch separated at screening station 62 may then be provided as an input batch to the controlled, hydraulic fluidized bed separator 66 where the material is then separated by density. At this stage, the input batch is in a slurry form as a result of the wet screening operation at screening station 62. In the illustrated embodiment, the fluidized bed separator 66 includes one or more chambers capable of containing a fluidized bed comprising a non-compressible fluid, such as, for example, water. The slurry batch is introduced into the chamber(s). In the disclosed embodiment, water is supplied from the bottom of the chamber with a controlled, upwardly flowing current so that the input batch slurry and water form a fluidized bed having a very high turbidity, causing the relatively lower density constituents to migrate upward in a fluidized bed, while the relatively higher density constituents (e.g., iron) to settle in the receptacle. The water flow may be controlled to achieve the appropriate separation of the lighter density constituents from the heavier density constituents, and migration of the lighter density constituents from an upper outlet 68 while the heavier constituents exit from outlet 70.

In the disclosed embodiment of the system 50, the density separator station 66 is controlled to separate the slurry batch into a portion that has a relatively lower density of about 2.30-2.70 g/cm³, and a portion that has a relatively higher density of about 5.0-6.0 g/cm³. The target densities may, of course, be varied based upon the types and densities of the different constituents present in the input batch, as well as the densities of those constituents targeted for isolation and recovery (e.g., iron). The fluidized bed density separation system may be controlled as described in U.S. Pat. No. 6,142,311, issued to Rolf Korber, for a "Process For Controlling A Sand And Gravel Sorting And Sizing Device," the disclosure of which is hereby incorporated herein in its entirety.

The relatively heavier portion developed at station 66 is collected at a de-watering screening station 72 where the still slurry batch portion is dried and moved by conveyor 74 to be stockpiled (at 76). Similarly, the relatively lighter portion developed at station 66 is collected at a de-watering screening station 78, where this slurry is dried and moved by conveyor 80 to be stockpiled (at 82). Relatively small screens (typically less than about 0.8 mm openings, suitable for filtering out only the water and as little of the particulate as possible) may be employed at de-watering stations 72 and 78. Various commercially available models of de-watering screens are available for use in stations 72 and 78.

The resulting relatively heavy product 76 typically includes an iron-rich (e.g., about 40-75% by weight) content, making it suitable for resale. This material is usable by iron and steel makers, and may as well be used for other applications, such as, for example, for making counterweights. The resulting relatively lighter dried product 82 is typically discarded.

Process water collected from de-watering stations 72 and 78, as well as directly from fluidized bed separator 66, is collected in receiving tank 84, and then pumped under high pressure into a hydro-cyclone 86, where the remaining particulate is separated from the water by centrifugal force. The freshwater is then discharged from the hydro-cyclone 86 into a clean water tank 88 for reintroduction back into the system. The particulate recovered from the hydro-cyclone (not shown) may then be discharged onto a de-watering screen from which the water can be returned to clean water tank 88, and the dried particulates thereafter discarded.

It will be appreciated that cleaning, and recycling the system water provides an energy-efficient, resource-efficient and cost efficient, closed-loop system. Other types of filtration systems, such as, for example, belt presses, filter presses, settling tanks, and flocculants, may, of course, be utilized to accomplish the same goal.

Figure 3:
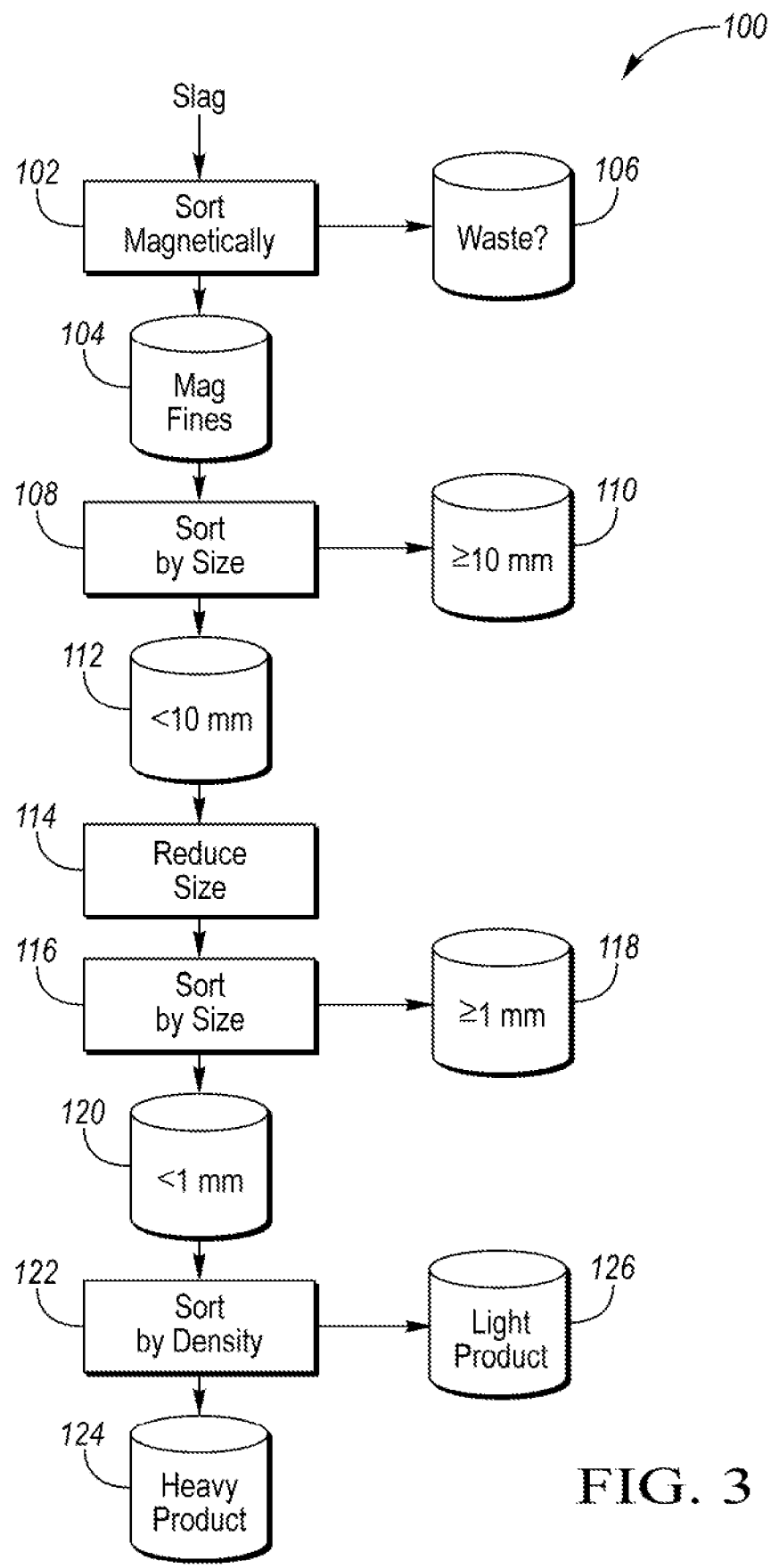
FIG. 3 is a block diagram of the recovery method employed in the system disclosed in FIG. 2.

FIG. 3 illustrates one of the methods that may be implemented with the system 50 shown in FIG. 2. In this illustrated method 100, the slag fines may first be sorted magnetically, at 102, to isolate the relatively larger iron-bearing constituents 104 from the non-magnetic materials 106.

The resulting iron-bearing product is typically then sorted, at 108, by size, typically by dry-screening the material. The relatively larger (e.g., greater than about 10 mm) particles 110 separated during this dry-screening step comprise a relatively iron-rich (i.e., about 50-70% by weight) which may be isolated from further processing and resold to steel producers as B-scrap for use as input in the iron blast furnace.

The remaining, relatively smaller and iron-poor fines 112 are then further processed, typically by milling or grinding, at 114, to physically separate the slag portion from the iron portion of the material. The milling or grinding station also reduces the average particle size of the batch.

The milled material is then again sorted by size, at 116, typically by wet-screening. The relatively larger (e.g., greater than about 1 mm) particles 118 separated during this screening step have also been found to comprise another relatively iron-rich (i.e., about 60-80% by weight) product which may again be isolated from further processing for re-sale again, for example, to steel makers for use as input material in their sinter plant.

The relatively smaller (e.g., less than about 1 mm) material 120 produced by the wet-screening step are then classified by density, at 122. This resulting material, now a slurry, is introduced as feed material into a hydraulic fluidized-bed density separator which is controlled to separate the suspended particles by their differing densities. The relatively denser slurry (the "heavy product") 124 is relatively iron-rich (i.e., about 40-75% by weight), and may have sufficient iron content to be resold again, for example, as input to an iron sinter plant. The lower density slurry (the "light product") 126 comprises a greater proportion of slag material (and other low-density non-ferrous constituents). Each of the heavy product 124 and light product 126 slurries are dried, typically by discharging the slurries onto de-watering screens. The dried heavy and light products are then stockpiled for sale and/or disposal.

It should be appreciated that, as previously described, the disclosed system and method may be employed to perform the various classifying processes in a variety of different sequences, depending upon the characteristics of the slag fines and the desired iron content recovery. Similarly, the portion of the system and method, utilizing certain selected, but not all of the disclosed, classifying methods where such alternatives are efficient and productive. For example, in one embodiment a method including only the steps described at 114, 116, and 122 of FIG. 3, to effectively recover iron-rich product.

It should similarly be appreciated that the system and method of the present invention may be modified to obtain recovered product of a variety of different ratios of iron/slag/minerals, where such products are indicated as useful in industries other than iron and/or steel-making, such as, for example, the cement industry, the agricultural industry, or the aggregate industry.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for recovering relatively iron-rich material from slag fines, the system including:
 a first size classifying station for receiving a first batch of material including slag fines, and separating the material in the first batch into a group of particles of size greater than or equal to 10 mm and a group of particles of size less than 10 mm;
 a crushing station for receiving a second batch including the group of particles of size less than 10 mm and crushing the particles in the second batch;
 a second size classifying station for receiving the second batch and separating the particles in the second batch into a group of particles of size greater than or equal to 1 mm and a group of particles of size less than 1 mm; and
 a hydraulic fluidized bed density separator for receiving a third batch including the group of particles of size less than 1 mm and separating the particles in the third batch into a group of particles having a relatively lower density and a group of particles having a relatively higher density, wherein the group of particles having a relatively higher density is high enough in density to include an iron content of at least about 40% by weight, and wherein the group of particles having a relatively lower density is a slurry batch portion having a density of 2.3-2.7 g/cm$^3$ and the group of particles having a relatively higher density is another slurry batch portion having a density of 5.0-6.0 g/cm$^3$.

2. The system of claim 1 wherein the crushing station includes a mill.

3. The system of claim 1 wherein the crushing station includes a grinder.

4. The system of claim 1 wherein the crushing station includes a vertical shaft mill.

5. A method for recovering iron-rich material from slag fines comprising performing the following steps:
 a) classifying a selected input batch of material based upon its size into a relatively larger particle size group and relatively smaller particle size group;
 b) repeating step a) using the relatively smaller size particle group from the previous iteration of step a) until the relatively smaller particle size group is 10 mm or less in size;
 c) classifying the material group obtained from step b) based upon its size into a second relatively larger particle size group, and a second relatively smaller particle size group wherein the second relatively larger particle size group is greater than 1 mm; and
 d) classifying the material second relatively smaller particle size group obtained from step c) based upon its density into a group of particles having a relatively lower density and a group of particles having a relatively higher density by introducing the material as a slurry into a hydraulic fluidized bed separator, wherein the group of particles having a relatively higher density is high enough in density to include an iron content of at least 40% by weight;
 wherein the material classified in step d) includes separating materials into a slurry batch portion having a density of 2.3-2.7 g/cm$^3$ and a slurry batch portion having a density of 5.0-6.0 g/cm$^3$.

6. The method of claim 5 wherein the relatively smaller particle size material obtained in at least one iteration of step a) is provided as the selected input batch in a crushing operation.

7. The method of claim 6 wherein the crushed material is provided as the selected input batch for at least one iteration of classifying step a).

8. The method of claim 6 wherein the crushed material is provided as the selected input batch for classifying step c).

9. A method for recovering iron-rich material from slag fines comprising performing the following steps in the following sequence:
 a) classifying a selected input batch of material based upon its magnetic properties into a magnetic material group and a non-magnetic material group;
 b) classifying the non-magnetic material group obtained from step a) based upon its size into a relatively larger particle size group, wherein the relatively smaller particle size group is 10 mm or less in size;
 c) crushing the relatively smaller particle group obtained from step b);
 d) classifying the material group obtained from step c) based upon its size into a second relatively larger particle size group, and a second relatively smaller particle size group wherein the relatively smaller particle size group of step d) is 1 mm or less in size; and
 e) classifying the material second relatively smaller particle size group obtained from step d) based upon its density into a group of particles having a relatively lower density and a group of particles having a relatively higher density by introducing the material as a slurry into a hydraulic fluidized bed separator, wherein the group of particles having a relatively higher density is high enough in density to include an iron content of at least 40% by weight, wherein the material classified in step e) includes separating materials into a slurry batch portion having a density of 2.3-2.7 g/cm$^3$ and a slurry batch portion having a density of 5.0-6.0 g/cm$^3$.

10. The method of claim 9 wherein the relatively larger particle size group of step b) has an iron content of 50-70% by weight.

11. The method of claim 9 wherein the relatively larger particle size group of step d) has an iron content of 60-80% by weight.

12. The method of claim 9 wherein the group of particles having a relatively higher density has an iron content of 40-75% by weight.

13. The method of claim 9 wherein the crushing operation includes a milling operation.

14. The method of claim 9 wherein the crushing operation includes a grinding operation.

15. The method of claim 9 wherein the crushing operation includes a vertical shaft milling operation.

16. The method of claim 9 further comprising providing a stream of slag fines to be classified in step a).

17. The method of claim 9 wherein classifying the non-magnetic material group in step b) includes dry screening the non-magnetic material group obtained from step a).

18. The method of claim 9 wherein classifying the material group in step d) includes wet screening the material group obtained from step c).

19. The method of claim 9 further comprising collecting and drying the group of particles having the relatively higher density from step e).

20. The method of claim 9 further comprising collecting and drying the group of particles having the relatively lower density from step e).

* * * * *